United States Patent
Baerenreuter et al.

(10) Patent No.: US 11,078,868 B2
(45) Date of Patent: Aug. 3, 2021

(54) PISTON RING

(71) Applicant: FEDERAL-MOGUL BURSCHEID GMBH, Burscheid (DE)

(72) Inventors: Dirk Baerenreuter, Odenthal (DE); Markus Kellner, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 16/479,975

(22) PCT Filed: Feb. 6, 2018

(86) PCT No.: PCT/DE2018/100098
§ 371 (c)(1),
(2) Date: Jul. 23, 2019

(87) PCT Pub. No.: WO2018/157880
PCT Pub. Date: Sep. 7, 2018

(65) Prior Publication Data
US 2019/0376467 A1      Dec. 12, 2019

(30) Foreign Application Priority Data
Mar. 1, 2017   (DE) .......................... 102017104221.0

(51) Int. Cl.
*F16J 9/26* (2006.01)
*F02F 5/00* (2006.01)
*F16J 9/20* (2006.01)

(52) U.S. Cl.
CPC .................................... *F02F 5/00* (2013.01); *F16J 9/26* (2013.01); *F16J 9/20* (2013.01)

(58) Field of Classification Search
CPC . F16J 9/00; F16J 9/12; F16J 9/20; F16J 9/26; F16J 9/28; F02F 5/00
See application file for complete search history.

(56) References Cited

U.S. PATENT DOCUMENTS

| | | | |
|---|---|---|---|
| 1,251,906 A * | 1/1918 | Moratta | F16J 9/20 277/441 |
| 8,979,094 B2 | 3/2015 | Esser | |
| 9,086,148 B2 | 7/2015 | Kennedy | |
| 2010/0117304 A1 | 5/2010 | Esser et al. | |
| 2012/0205876 A1* | 8/2012 | Fujimura | F16J 9/26 277/442 |
| 2012/0228831 A1 | 9/2012 | Herbst-Dederichs et al. | |

(Continued)

FOREIGN PATENT DOCUMENTS

| | | |
|---|---|---|
| DE | 2135338 A1 | 1/1973 |
| DE | 4441136 A | 7/1995 |

(Continued)

*Primary Examiner* — Gilbert Y Lee
(74) *Attorney, Agent, or Firm* — Norris McLaughlin, P.A.

(57) ABSTRACT

A piston ring, and in particular a compression piston ring, has a running face, upper and lower flank regions, an inner circumferential surface and a joint, wherein at least the running face is provided with at least one wear-resistant PVD or CVD layer, wherein the PVD or CVD layer extends at a predefinable layer thickness across a circumferential length of more than 95%, but less than 100% of the piston ring, and defined circumferential sections are designed in a layer-free manner in the region of the joint.

10 Claims, 1 Drawing Sheet

(56) References Cited

U.S. PATENT DOCUMENTS

2014/0217677 A1* 8/2014 Smith .................. C23C 14/028
                                                        277/444
2018/0080556 A1* 3/2018 Sato ......................... F16J 9/26

FOREIGN PATENT DOCUMENTS

| DE | 102007007960 A1 | 8/2008 |
| DE | 102011003254 A1 | 8/2012 |
| DE | 102011010656 A1 | 8/2012 |
| EP | 2 499 402 B1    | 1/2014 |
| GB | 2284037 A       | 5/1995 |
| JP | H03125077 A     | 5/1991 |
| WO | 2014/107780 A1  | 7/2014 |

* cited by examiner

PISTON RING

BACKGROUND OF THE INVENTION

The invention relates to a piston ring, and in particular a compression piston ring.

Compression piston rings face the combustion chamber and are exposed to the combustion gases present there, the open joint forming an area for combustion gases to pass through. In particular in the case of piston rings provided with PVD or CVD layers, spalling of the layer can be observed in the vicinity of the joint.

EP 2 499 402 B1 discloses a piston ring, and in particular a compression piston ring, comprising a running face, upper and lower flank regions, an inner circumferential surface and a joint, wherein the wall thickness of the piston ring, seen across the circumference thereof, has a uniform design and at least the running face is provided with a single PVD or CVD layer. In the regions of the circumference close to the joint, proceeding from a respective edge of the joint, up to a circumferential angle of <20°, the roughness of the running face is higher than in the remaining circumferential region of the running face, and the layer thickness is lower than the layer thickness in the remaining circumferential region of the running face.

SUMMARY OF THE INVENTION

It is the object of the invention to provide a novel piston ring design in which the hot combustion gases flowing through the joint gap do not damage the applied running face layer.

It is a further object of the invention to propose a method for producing a piston ring by way of which a piston ring can be machined so that layer chipping in the operating state can be substantially avoided.

This object is achieved in a piston ring, and in particular a compression piston ring, in that the PVD or CVD layer extends at a predefinable layer thickness across a circumferential length of more than 95%, but less than 100% of the piston ring, and defined circumferential sections are designed in a layer-free manner in the region of the joint.

The object is also achieved by a method for producing a piston ring, wherein a piston ring base body that is provided with a joint and made of gray cast iron or steel is provided, which has a greater radial wall thickness across a defined circumferential length than the joint-side circumferential region, at least the entire running face of the piston ring, up to the joint, is provided with at least one PVD or CVD layer, and the PVD or CVD layer is removed down to the base material of the piston ring across a defined circumferential section in the region of the joint.

By way of the piston ring of the invention, or the method according to the invention, it is now possible for the hot combustion gases flowing through the joint gap not to come in direct contact with the wear-resistant PVD or CVD layer, and in particular the TaC layer. In this way, spalling is prevented in the circumferential region of the piston ring, close to the joint. Since the actual wear protection layer is now spatially separated from the hot combustion gases in the joint gap, the layer is also not exposed to such a high thermal load, whereby the risk of spalling of the layer due to thermal loading is reduced.

The PVD or CVD layer, and in particular the TaC layer, preferably has a layer thickness of 5 to 30 µm.

According to a further idea of the invention, it is proposed to design the radial wall thickness of the piston ring in the fully machined state so that the coated circumferential regions of the piston ring correspond to the non-coated circumferential sections, whereby an identical radial wall thickness is provided, seen across the entire circumferential surface of the piston ring.

It can be advantageous that the roughness of the coated circumferential regions is different from that of the non-coated circumferential sections. It may be useful for the roughness of the coated circumferential sections to be different from that of the non-coated circumferential sections as a function of the base material of the piston ring.

BRIEF DESCRIPTION OF THE DRAWINGS

The subject matter of the invention is shown in the drawing based on an exemplary embodiment and is described as follows. In the drawings.

DETAILED DESCRIPTION OF THE INVENTION

Figure 1:
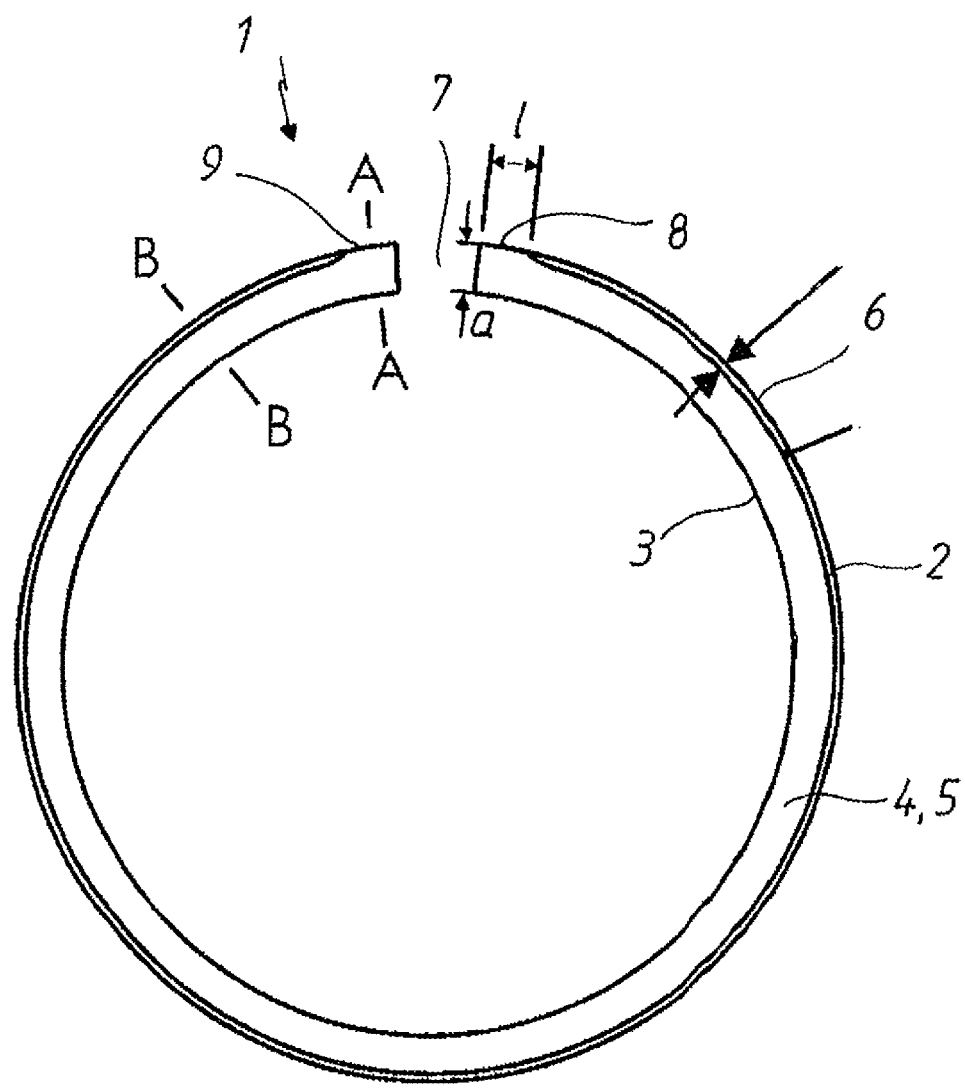
FIG. 1 shows a top view onto a fully machined piston ring.

FIG. 1 shows a piston ring designed 1 as a compression piston ring, comprising a running face 2, an inner circumferential surface 3, and upper and lower flank regions 4, 5. In the region of the running face 2, the piston ring 1 is provided with a wear-resistant layer 6, which in the present example is designed as a TaC layer and, in the present example, is to have a layer thickness of 15 µm. The base material of the piston ring 1 is to be made of gray cast iron in the present example.

The piston ring 1 is furthermore provided with a joint 7. In the finished state, the piston ring 1 is provided, on both sides of the joint 7, with a non-coated circumferential section 8, 9 across a predefinable circumferential length l. This measure ensures that combustion gases passing through in the region of the joint 7 cannot reach the region of the TaC layer 6 directly. In this way, spalling of the layer is at least reduced, if not entirely suppressed, in the region of the joint 7.

In the fully machined state, the piston ring 1 has a radial wall thickness a, which is the same both in the coated region and in the non-coated circumferential section l. However, different roughness levels of the two regions are provided.

Figure 2:
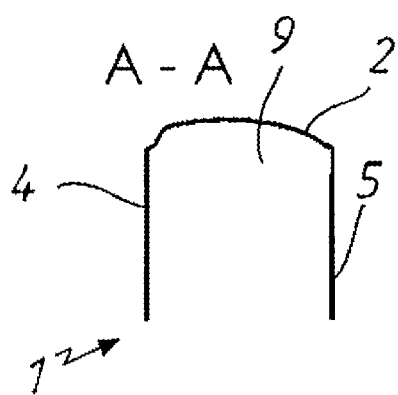
FIGS. 2 and 3 show different sections through the piston ring according to FIG. 1.

FIG. 2 shows a section A-A through the coating-free circumferential section 9 of the piston ring 1. In addition to the running face 2, the upper flank surface 4 and the lower flank surface 5 are apparent.

Figure 3:
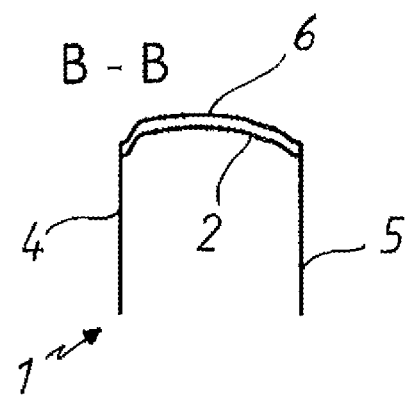

FIG. 3 shows a section B-B through a coated region of the piston ring 1. The running face 2, the upper flank surface 4 and the lower flank surface 5 are apparent here as well. In addition, the TaC layer 6 is indicated.

The invention claimed is:

1. A piston ring comprising a running face, upper and lower flanks, an inner circumferential surface and a joint constituted of free ends of the piston ring and a space therebetween, the space extending completely through the piston ring radially and axially so that the free ends of the piston ring do not overlap one another, at least the running face being provided with at least one wear-resistant PVD or CVD layer, wherein the at least one PVD or CVD layer extends as a layer of predetermined thickness across a region constituting a circumferential length of more than 95% but less than 100% of a circumferential length of the piston ring as measured from one of the free ends to the other of the free ends of the piston ring and the only regions of the circumferential length of the piston ring to which the PVD or CVD layer does not extend are end regions of the free ends of the piston ring adjacent the space therebetween.

2. The piston ring according to claim 1, wherein the at least one wear-resistant PVD or CVD layer is a TaC layer.

3. The piston ring according to claim 1, wherein the predetermined thickness of the at least one PVD or CVD layer is 5 to 30 μm.

4. The piston ring according to claim 1, wherein a base body of the piston ring is configured so that radial wall thickness of the piston ring is same in the region provided with the PVD or CVD layer and the regions not provided with the PVD or CVD layer.

5. The piston ring according to claim 1, wherein roughness of the regions provided with the PVD or CVD layer is different from roughness of regions not provided with the PVD or CVD layer.

6. The piston ring according to claim 1, wherein the region wherein the at least one PVD or CVD layer extends as a layer of predetermined thickness comprises the entire dimension of the piston ring in an axial direction of the piston ring.

7. A method for producing a piston ring according to claim 1, comprising providing a piston ring base body having the joint and made of gray cast iron or steel as a base material, the base body having a lesser wall thickness at said regions contiguous with the free ends than at the rest of circumferential length of the piston ring providing a region comprising at least the entire running face of the piston ring, up to the joint with at least one PVD or CVD layer, and removing the at least one PVD or CVD layer down to the base material of the piston ring at said regions contiguous with the free ends.

8. The method according to claim 7, wherein the at least one PVD or CVD layer is a TaC layer.

9. The method according to claim 7, wherein the removing of the at least one PVD or CVD layer is by grinding.

10. The method according to claim 7, wherein the base body is configured so that radial wall thickness of the piston ring is the same in the region provided with the PVD or CVD layer as in the regions not provided with the PVD or CVD layer.

* * * * *